United States Patent
Boenig et al.

(10) Patent No.: US 8,019,517 B2
(45) Date of Patent: Sep. 13, 2011

(54) AGRICULTURAL HARVESTING MACHINE

(75) Inventors: Ingo Boenig, Guetersloh (DE); Andreas Haffert, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 107 days.

(21) Appl. No.: 12/481,126

(22) Filed: Jun. 9, 2009

(65) Prior Publication Data

US 2009/0312920 A1 Dec. 17, 2009

(30) Foreign Application Priority Data

Jun. 12, 2008 (DE) .................. 10 2008 027 906

(51) Int. Cl.
*A01D 41/127* (2006.01)
(52) U.S. Cl. ..................... 701/50; 56/10.2 R; 460/1
(58) Field of Classification Search .............. 701/50; 460/1; 56/10.2 R
See application file for complete search history.

(56) References Cited

U.S. PATENT DOCUMENTS

| | | | |
|---|---|---|---|
| 4,527,241 A * | 7/1985 | Sheehan et al. ................. 701/50 |
| 5,586,033 A | 12/1996 | Hall | |
| 5,666,793 A * | 9/1997 | Bottinger ................... 56/10.2 R |
| 5,775,072 A * | 7/1998 | Herlitzius et al. .......... 56/10.2 R |
| 6,167,337 A * | 12/2000 | Haack et al. ..................... 701/50 |
| 6,205,384 B1 * | 3/2001 | Diekhans ........................ 701/50 |
| 6,431,981 B1 * | 8/2002 | Shinners et al. .................. 460/6 |
| 6,553,300 B2 * | 4/2003 | Ma et al. ......................... 701/50 |
| 6,863,604 B2 | 3/2005 | Behnke | |
| 7,231,814 B2 * | 6/2007 | Platon et al. ...................... 73/73 |
| 7,343,262 B2 * | 3/2008 | Baumgarten et al. ......... 702/129 |
| 7,362,233 B2 * | 4/2008 | Behnke et al. ................. 340/684 |
| 7,630,809 B2 * | 12/2009 | Behnke et al. .................. 701/50 |

FOREIGN PATENT DOCUMENTS

EP 1 297 733 4/2003

* cited by examiner

*Primary Examiner* — Thomas B Will
*Assistant Examiner* — Joel Mitchell
(74) *Attorney, Agent, or Firm* — Michael J. Striker

(57) ABSTRACT

An agricultural harvesting machine includes different working units, an input and display unit, a memory and evaluation unit, and a control device for influencing adjustable operating parameters of the working units, at least one set criterium being stored in the memory and evaluation unit, and, based on at least one crop material parameter and/or operating parameter that was determined in the harvesting process, and based on the at least one set criterium, a prognosis regarding the attainability of an actual harvesting goal is formulated, the prognosis being taken into account in the adjustment of the operating parameters.

12 Claims, 3 Drawing Sheets

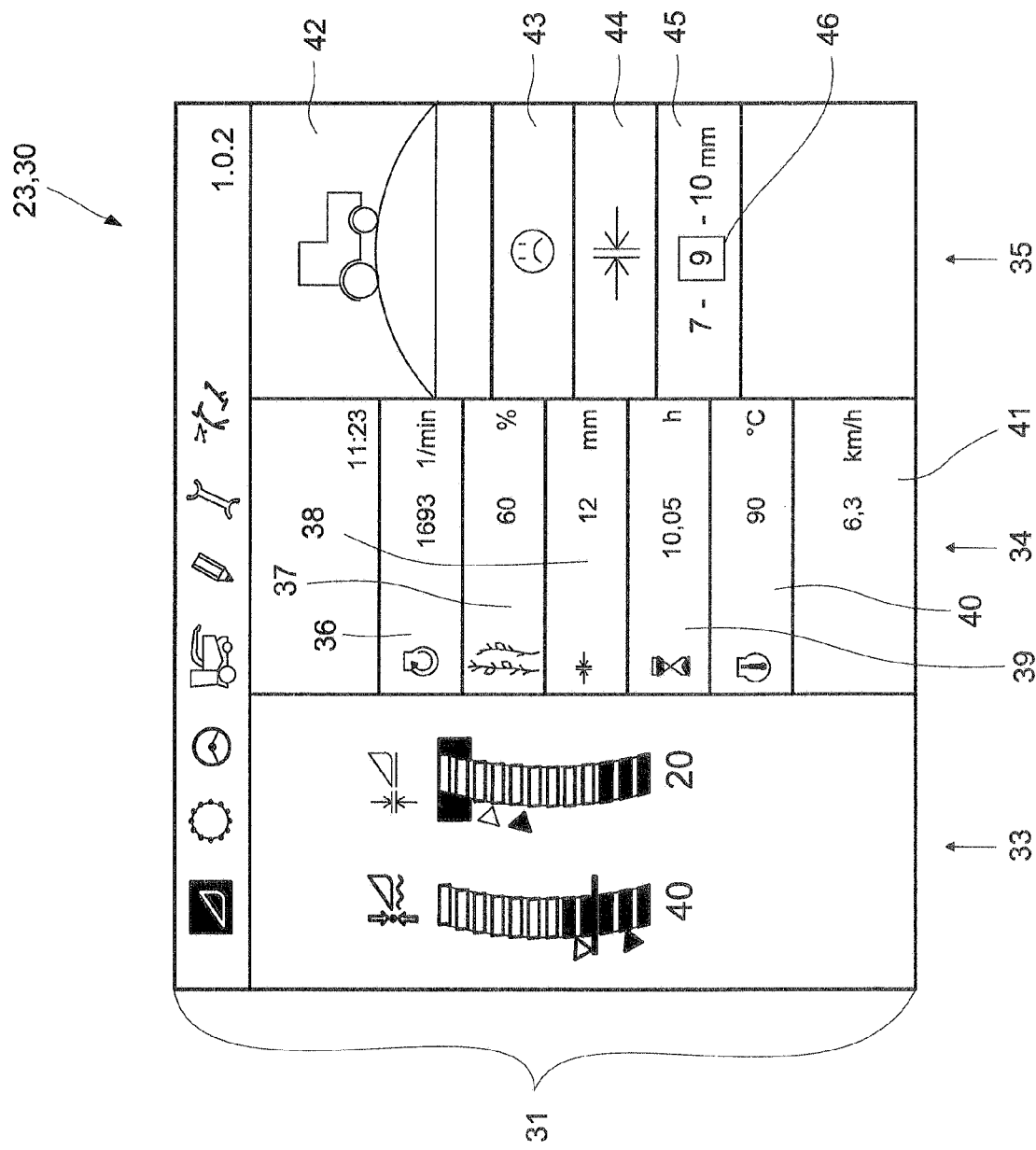

AGRICULTURAL HARVESTING MACHINE

CROSS-REFERENCE TO A RELATED APPLICATION

The invention described and claimed hereinbelow is also described in German Patent Application DE 10 2008 027 906.4 filed on Jun. 12, 2008. This German Patent Application, whose subject matter is incorporated here by reference, provides the basis for a claim of priority of invention under 35 U.S.C. 119(a)-(d).

BACKGROUND OF THE INVENTION

The present invention relates to an agricultural harvesting machine.

For the operator of a harvesting machine, it is imperative that the parameters of the machine components be set correctly in order to ensure that a harvesting process is attained that reaches a desired harvesting goal to be attained at the end of the harvesting process chain. As a result, it is now common when harvesting grass or corn for silage, for instance, for the operator to set operating parameters, e.g. the length of cut, before and while working a field. The operator relies largely on experience when setting the operating parameters. Since other vehicles are used in the harvesting process chain in addition to the harvesting machines, e.g. hauling vehicles and compacting vehicles in the silo, very complex interrelationships exist between the vehicles involved in the harvesting process and their influence on the desired harvesting goal to be attained at the end of the harvesting process chain, such as the desired level of compaction of crop material in a silo, thereby making it difficult even for experienced operators to estimate whether the operating parameters he selected will actually result in the desired harvesting goal being attained. In particular, the comparison that is used, i.e. a comparison of an actual value of individual operating parameters with a setpoint value (=ideal value) for the particular operating parameter, is not very effective in predicting whether or not a desired harvesting goal will be attained at the end of the harvesting process chain.

Several possibilities for solving this problem have been made known in the related art; the possibilities are designed to assist the operator of the agricultural harvesting machine in selecting the optimal operating parameters. For example, EP 1297 733 A1 makes known a method for determining harvesting machine settings, in the case of which the harvesting machine is acted upon during operation by a nearly consistent quantity of crop material, then the working result is recorded after a certain time delay and is stored together with the associated operating parameters of the working units. The operator may now change an operating parameter of a working unit, the harvesting machine restarts operation, and the process—described above—of recording the working results and storing them together with the associated operating parameters is repeated. The two recorded working results are now compared with each other, and the operating parameters of the better working result are used to set up the working units. The disadvantage of this method is that, due to the time delay between the particular start of the harvesting operation and the instant when the working result is attained, a great deal of time is required to optimize the operating parameters.

It is also disadvantageous that the operator must repeatedly try to attain a nearly constant crop material throughput rate in order to ensure that the working results obtained using different operating parameters may be compared with one another. However, it is not possible to make a reliable prognosis as to whether a desired harvesting goal is attainable. This requires a great deal of experience and ability on the part of the operator, and it requires a great deal of time. A further example of entering settings for a harvesting machine is disclosed in U.S. Pat. No. 5,586,033, in which a control system trains a neural network model of the harvesting machine with data. The model is then used to select the settings for the harvesting machine. However, neural networks having large capacity require a level of computational ability that is practically unaffordable. Given the current status of development of neural network techniques, large neural networks have limited practical utility in harvesting machine applications.

SUMMARY OF THE INVENTION

The object of the present invention, therefore, is to avoid the disadvantages of the related art mentioned above, and, in particular, to refine an agricultural harvesting machine in a manner such that it easily provides the operator with a reliable prognosis during the on-going harvesting process as to which harvesting goal is attainable at the end of the harvesting process chain using the selected operating parameters, thereby ensuring that the prognosis may be taken into account when the operating parameters are adjusted as necessary.

In keeping with these objects and which others which will become apparent hereinafter, one feature of the present invention resides briefly stated, in an agricultural harvesting machine, comprising a plurality of working units; an input and display unit; a memory and evaluation unit; and a control unit for influencing adjustable parameters of said working units, said memory and evaluation unit storing at least one set criterium in a recallable manner, so that based on at least one parameter selected from the group consisting of a crop material parameter, an operating parameter and both that was determined in a harvesting process, and based on the at least one said criterium, a prognosis regarding an attainability of an actual harvesting goal is formulated and taken into account in an adjustment of the operating parameters by said control unit.

Given that at least one set criterium is stored in a recallable manner in a memory and evaluation device which is assigned to the agricultural harvesting machine, and, given that a prognosis regarding the attainability of a current harvesting goal to be attained at the end of the harvesting process chain is derived based on at least one crop material parameter and/or operating parameter that was determined in the current harvesting process, and based on the at least one set criterium, and, given that the prognosis is taken into account in the adjustment of the operating parameters, an operator—be it an inexperienced operator or an experienced operator—is able to estimate, based on the prognosis, whether a desired harvesting goal is attainable using the selected operating parameters, and the operator may take the prognosis into account when making any necessary changes to the operating parameters if the prognosis does not agree with the desired harvesting goal.

Given that the at least one set criterium defines an attainable set harvesting goal that is the relationship between at least one operating parameter and at least one crop material parameter, it is ensured that the operator, in particular an inexperienced operator, is provided with a highly reliable prognosis regarding the attainable actual harvesting goal, and is continually informed as to whether this prognosis corresponds with the desired harvesting goal, thereby enabling him to adjust the operating parameters as necessary. A practical application of an agricultural harvesting machine, in particular a forage harvester, is given when the set harvesting goal is the compactability of crop material, which is determined based on the relationship between the parameters of crop material type, crop material moisture, and length of cut; a comparison of the set criterium with the currently selected length of cut and the crop material moisture determined in the harvesting process is then carried out in the memory and evaluation device, and a prognosis may be formulated as to whether the desired harvesting goal, e.g. a desired level of compaction of the crop material, e.g. corn or grass in a silo, is attainable using the current operating parameters.

An extremely accurate prognosis regarding the attainability of an actual harvesting goal is obtained when the set harvesting goal is based on expert knowledge which has been obtained, e.g. based on a large number of tests carried out at a testing installation, and is therefore statistically confirmed. It is also feasible for the expert knowledge to be based on knowledge that was obtained via a large number of actual harvesting results, or on knowledge obtained from many operators of machines that are used in the harvesting process. Advantageously, the set harvesting goal which is based on expert knowledge is stored in the memory and evaluation unit in the form of at least one characteristic curve, thereby making it possible to formulate the prognosis regarding the attainable actual harvesting goal very rapidly for different harvesting conditions, based on the comparison with the current operating parameters and crop material parameters.

In an advantageous development of the present invention, the prognosis of an attainable actual harvesting goal is displayed, in an evaluated form, to the operator, thereby ensuring that the operator—be it an inexperienced operator or an experienced operator—is provided with information regarding the quality of the attainable actual harvesting goal to be reached at the end of the harvesting process chain, with the current operating parameters and crop material parameters having been taken into consideration. To obtain an accurate quality indication, at least one threshold value is stored in the memory and evaluation unit; the prognosis is negative if the threshold value is fallen below, and the prognosis is positive if the threshold value is exceeded, thereby advantageously ensuring that an inexperienced operator, in particular, need not perform his own estimation of the quality of the attainable harvesting goal. The operator of the harvesting machine is thereby further relieved of tasks to perform. In order to advantageously obtain the best statistically confirmed evaluation result possible, the threshold value is also based on expert knowledge which itself may be based on a large number of tests that were carried out at a testing installation, or on a large number of actual harvesting results. It is also feasible for the threshold value to be determined by the operator himself, thereby ensuring, in particular, that the knowledge of highly experienced operators is utilized.

Given that at least one further operating parameter of a vehicle that is involved in the harvesting process is used to determine the threshold value, it being possible for the operator himself to enter the operating parameter in the memory and evaluation unit via the input and display unit, and/or for the operating parameter to be entered automatically via a data transfer device, it is advantageously ensured that changing conditions on the field itself, and changing conditions in the further harvesting process chain are taken into account in the formulation of the prognosis which may be used to adjust the operating parameters.

To advantageously provide the operator with leeway in terms of setting the operating parameters, it is provided in an advantageous development of the present invention that a lower limit and an upper limit are assigned to the threshold value, in which case values that are still within this threshold value range represent a positive prognosis of an actual harvesting goal, thereby informing the operator that the quality of the attainable harvesting goal is adequate.

In an advantageous embodiment of the present invention, if the prognosis of the attainability of an actual harvesting goal is negative, then operating parameters are displayed in the display unit that, if changed, would result in a positive prognosis, thereby advantageously assisting the operator in selecting the correct operating parameters. Advantageously, the operator is shown the operating parameters to be changed, along with the corresponding setting trends, thereby enabling the operator will adjust the operating parameters in the correct direction. The operator may be relieved of further tasks to perform in particular when, in a case such as this, the control device automatically sets the operating parameters—with consideration for the prognosis—that result in a positive prognosis.

To ensure that the operator of the agricultural harvesting machine may quickly see an overview of the operating parameters and/or the crop material parameters and/or the prognosis regarding the attainable actual harvesting goal and/or the evaluation result, this information is displayable—in an advantageous development of the present invention—in the form of numbers and/or terms and/or icons in the display unit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a display layout of the display unit in a second embodiment of the agricultural machine in accordance with the present invention.

DESCRIPTION OF THE PREFERRED EMBODIMENTS

Figure 1:
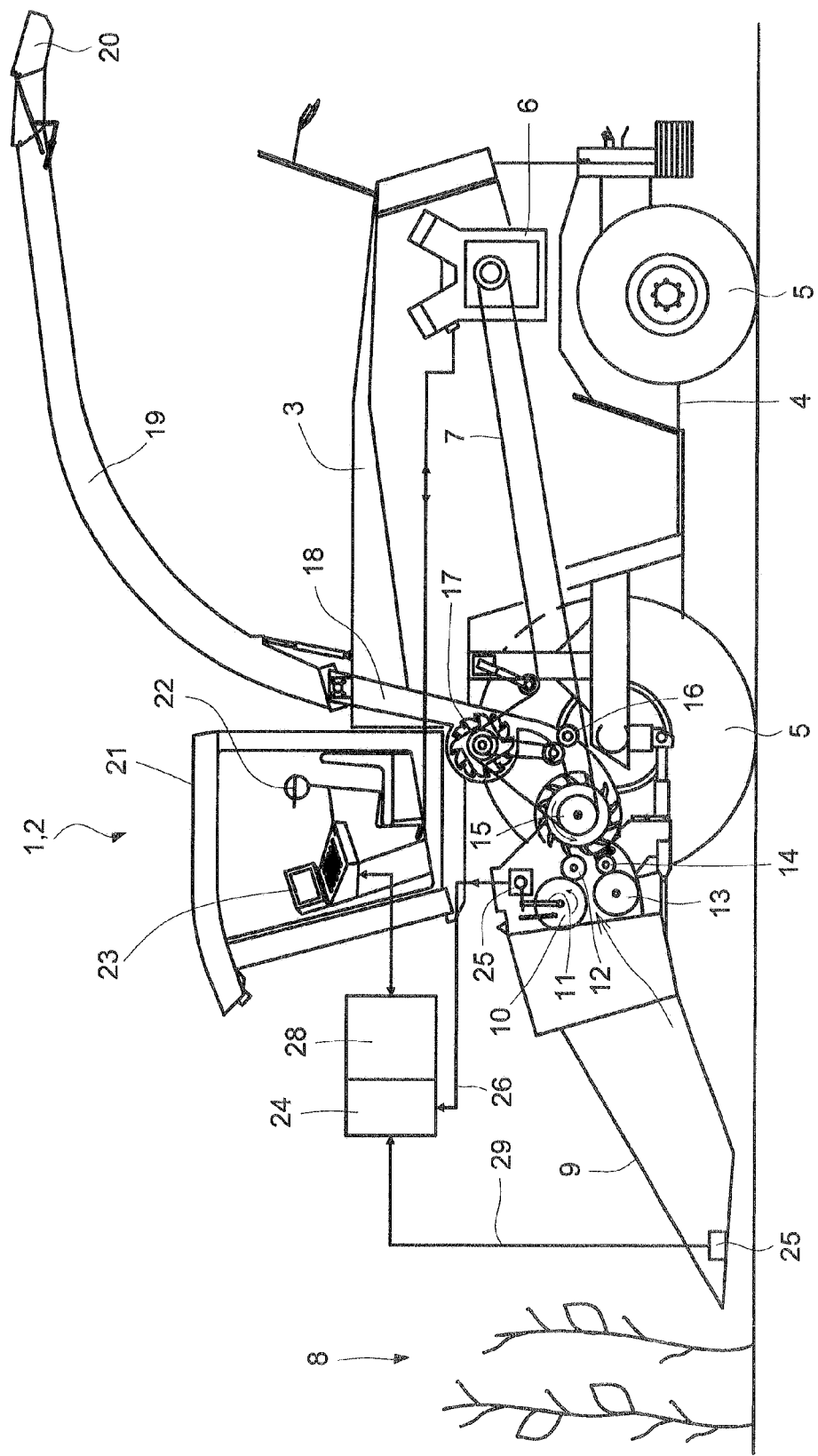
FIG. 1 shows a forage harvester in a partially exposed side view.

Agricultural harvesting machine 2 which is designed as a forage harvester 1 and is shown in a partially exposed side view in FIG. 1, includes a housing 3 and a ground drive 4 on which wheels 5 are situated. An engine 6 is used as the drive, and is connected via a belt 7 to the working units of forage harvester 1.

Crop material 8 to be harvested is cut and picked up using a front attachment 9. Front attachment 9 is followed directly by intake device 10 which, in this embodiment, includes two lower intake and compression rollers 11, 12, and two upper intake and compression rollers 13, 14 which are situated on a frame or housing 3.

To ensure that a defined length of cut of crop material 8 is attained in the harvesting process, the feed speeds of forage harvester 1 are continually increased along the path of crop material 8 through harvesting machine 2. This means that intake and compression rollers 11, 12, 13, 14 are driven at a lower circumferential speed than is chopper drum 15 which, in turn, is operated at a lower circumferential speed than is post-fragmentation device 16. Post-accelerator 17 transports crop material 8 to be conveyed through conveyor chute 18 and through upper discharge chute 19 and past upper discharge chute flap 20, to a trailer which is situated next to forage harvester 1 and is not shown here; the trailer is used to haul harvested, processed crop material 8 to a silo, for example, which is not shown here.

Forage harvester 1 includes a driver's cab 21 which provides space for operator 22. An input and display unit 23 is available to operator 22 so he may set the operating parameters, and which is used to inform operator 22 about the current operating conditions and harvesting conditions.

A control device 24 is used to control the working units of forage harvester 1, which are known per se and will therefore not be described in greater detail here. Control device 24 may be connected to one or more sensors 25 via lines 26 in order to control forage harvester 1 overall, and to control, e.g., intake device 10 using actuators which are known per se and are not shown here, in order to regulate the length of cut of crop material 8. It is also feasible for forage harvester 1 to be networked via a data transmission system which is known per se but is not depicted here, e.g. the Internet, radio networks, mobile telephone networks, or memory cards, with further vehicles that are involved in the harvesting process, e.g. further harvesting machines, hauling vehicles, or a compacting vehicle that is being operated at the silo.

In order to attain a desired harvesting goal at the end of the harvesting process, e.g. the desired level of compaction of crop material 8 in a silo, operator 22 must enter further operating parameters and the length of cut of crop material 8 before the harvesting process is started, e.g. the harvesting of a corn field. The length of cut may be determined as a function of the current harvesting conditions, in particular as a function of the crop material moisture which may be determined using a moisture sensor 27 which is situated in the region of front attachment 10. In addition, the length-of-cut setting depends on the desired level of compaction of the crop material in the silo. The signals generated by sensors 25, 27 are evaluated in a memory and evaluation unit 28 assigned to forage harvester 1, and they are visualized to operator 22 via input and display unit 23. In the case of changing harvesting conditions, experienced operator 22 will adjust the operating parameters accordingly, so that, e.g. if the crop material moisture changes during the harvesting process, experienced operator 22 will tend to shorten the length of cut if the crop material becomes drier, to ensure that the crop material may still be compacted adequately in a silo.

Since working vehicles—which are not shown here—other than harvesting machine 2 are used in the harvesting process chain, e.g. hauling vehicles and compacting vehicles in the silo, very complex interrelationships exist between the vehicles involved in the harvesting process and their influence on the desired harvesting goal to be attained at the end of the harvesting process chain, thereby making it difficult even for experienced operator 22 of an agricultural harvesting machine to estimate exactly whether the operating parameters he selected—with consideration for the crop material parameters that apply to the harvesting operation—will actually result in the desired harvesting goal to be attained at the end of the harvesting process chain, e.g. the desired level of compaction of the crop material in the silo per the current embodiment.

This is where the present invention comes in. At least one set criterium is stored in a recallable manner in memory and evaluation unit 28 assigned to forage harvester 1, and it advantageously defines an attainable set harvesting goal that represents the relationship between at least one operating parameter and at least one crop material parameter; to ensure that the set criterium is statistically confirmed, it is based on expert knowledge that has been determined, e.g. via a large number of tests that were carried out at a testing installation. It is also feasible for the expert knowledge to be based on the knowledge of experienced operators 22 of agricultural harvesting machines 2. The set harvesting goal that is attainable in the embodiment is the compactability of crop material 8 that exists due to the relationship between the crop material parameter "moisture" and the harvesting machine parameter "length of cut of crop material 8". It is also feasible for the set criterium to define other set harvesting goals. Using moisture sensor 27 which is situated in the region of front attachment 10 of harvesting machine 2, the crop material moisture is sensed during the harvesting process, and the related signal is sent to memory and evaluation unit 28 via line 29.

Memory and evaluation unit 28 compares the signal generated by moisture sensor 27 with the set criterium stored in memory and evaluation unit 28, and, based on the results of this comparison, and with consideration for the current length-of-cut setting which operator 22 may enter in memory and evaluation device 28 via input and display unit 23, formulates a prognosis regarding the actual harvesting goal that is attainable under the harvesting conditions that currently exist in the harvesting process and using the selected operating parameters, so that, if the prognosis does not match the desired harvesting goal, the prognosis is taken into account in a manner according to the present invention when the necessary adjustments are made to the operating parameters of the agricultural harvesting machine. It is feasible for the expert knowledge that represents the relationship between at least one operating parameter and at least one crop material parameter to be stored in memory and evaluation unit 28 as a characteristic curve. The characteristic curve, which is not shown here, represents the attainable level of compaction of crop material that exists due to the relationship between the crop material moisture and the length of cut of crop material 8, which may be based, e.g. on the results of a large number of compacting tests carried out at a testing installation in order to obtain a statistically confirmed prognosis. It is also feasible that a characteristic curve of this type which is based on expert knowledge is stored in memory and evaluation unit 28 as a set criterium for every length of cut that may be selected in the harvesting process.

To ensure that the prognosis provides operator 22 with an exact indication of the quality of the actual harvesting goal that may be attained, it is also possible for a threshold value to be stored in memory and evaluation unit 28 in a recallable manner; if the threshold value is fallen below, the quality of the attainable actual harvesting goal is not sufficient, and, if the threshold value is exceeded, the quality of the attainable actual harvesting goal is sufficient. In order to obtain a result in this case as well that is statistically confirmed to the greatest extent possible, the threshold value may be based on expert knowledge, similar to the set criterium. To ensure that the knowledge of highly experienced operators 22 may be used in the quality indication, it is possible for the threshold value to be determined by operator 22 himself. It is also feasible to use at least one operating parameter of a further vehicle that is involved in the harvesting process in order to determine the threshold value, it being possible for the operating parameter to be entered by operator 22 himself in memory and evaluation unit 28 via input and display unit 23, and/or for the operating parameter to be entered automatically via a data transfer device that is not shown here.

This has the advantage that, when the prognosis is formulated that is taken into account in the adjustment of the operating parameters, changing conditions on the harvesting field and changing conditions in the further harvesting process chain are incorporated in the prognosis. For example, a parameter of a compacting vehicle that is being operated at the silo may be taken into account in the formulation of the prognosis and, therefore, in the adjustment of the operating parameters of agricultural working machine 9. This may be, e.g. the maximum compacting force that may be applied by the compacting vehicle to compact crop material 8 in a silo. If the result of the prognosis is that, with consideration for the current operating parameters and crop material parameters, the desired actual harvesting goal is unattainable, then operating parameters are displayed in input and display unit 23 that, if changed, will result in a positive prognosis, thereby advantageously assisting operator 22 in selecting the correct operating parameters. Advantageously, operator 22 is shown the operating parameters to be changed, along with the corresponding setting trends, thereby enabling operator 22 to adjust the operating parameters in the correct direction. It is also feasible that the operating parameters are adjusted automatically; if the prognosis is negative, the appropriate signals are forwarded by control device 24 which is connected to memory and evaluation unit 28, to actuators—which are known per se—of the working units in order to ensure that the desired harvesting goal may be attained by adjusting the operating parameters.

Figure 2:
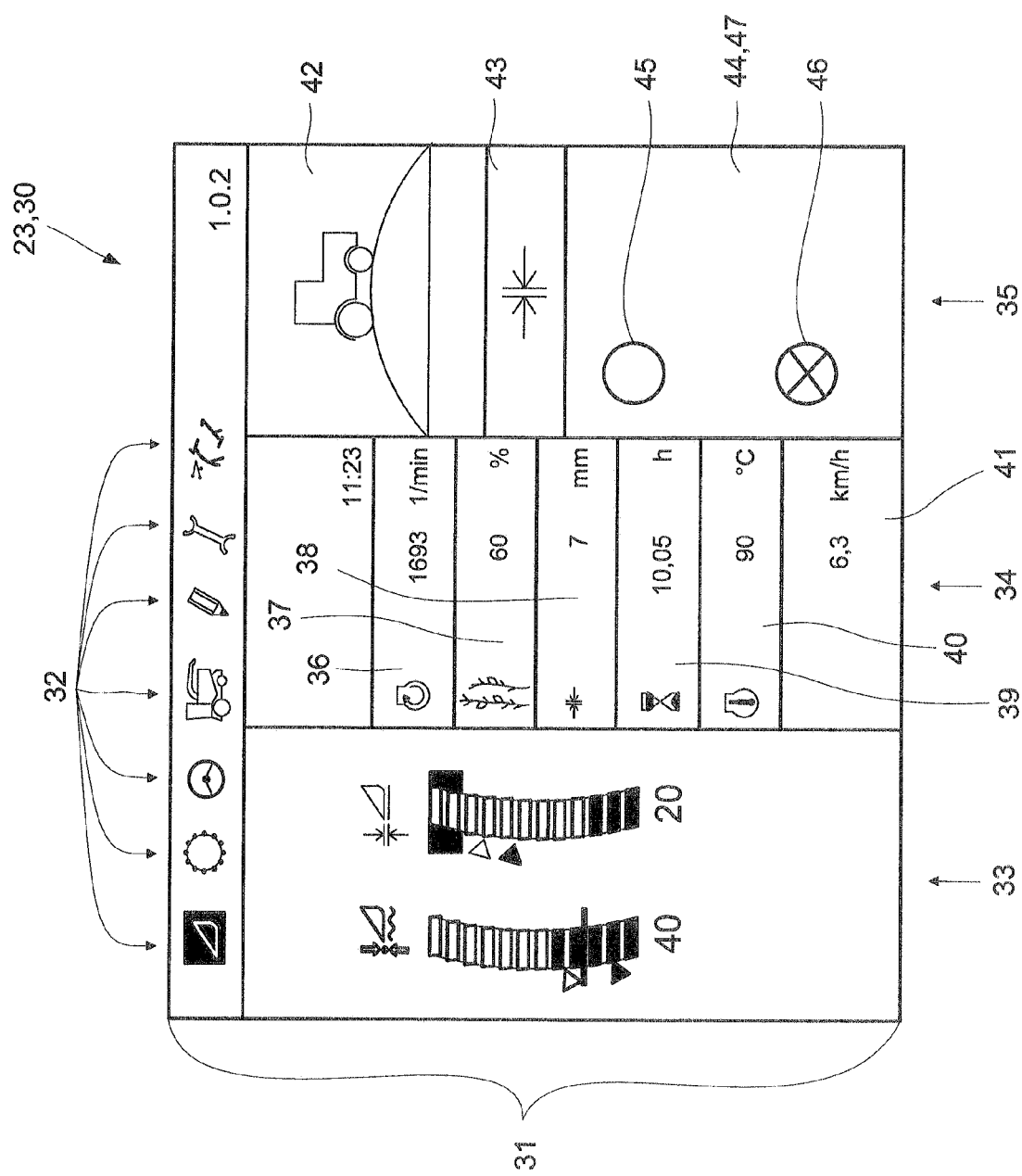
FIG. 2 shows a display layout of the display unit in a first embodiment of the agricultural machine in accordance with the present invention.

FIG. 2 shows, as an example, a depiction of the prognosis—which was formulated in the memory and evaluation unit—of the attainability of an actual harvesting goal on screen 30 of an input and display unit 23; the attainable actual harvesting goal is the attainable compactability in a silo, and the set criterium which is stored in the memory and evaluation unit is the set harvesting goal, i.e. the maximum attainable compactability of crop material that exists due to the relationship between the crop material moisture and the length of cut of the crop material, which is advantageously based on expert knowledge that was obtained in a large number of tests carried out at a compacting testing installation.

Input and display unit 23 shown in FIG. 2 is filled with a basic viewing screen 31. Various functionality windows 32 in which operating parameters and/or crop material parameters are stored are displayed in the upper region of basic viewing screen 31. They need not necessarily be shown on basic viewing screen 31 simultaneously. Instead, it may be possible to call them up via menus and submenus, in which operating parameters and/or crop material parameters may be grouped in a reasonable manner. The operator may freely select which operating parameters and/or crop-material parameters are displayed in individual functionality windows 32. Input and display unit 23 also includes three blocks 33, 34, 35. A first block 33 and a second block 34 show a selection of operating parameters and crop material parameters of the harvesting machine which is engaged in the harvesting process. Functionality windows 36, 37, 38, 39, 40, 41 display, e.g. the engine speed, the crop material moisture that was sensed, the current length-of-cut setting, the number of operating hours, the engine oil temperature, and the ground speed, as numerical values with the appropriate unit. In functionality window 42, third block 35 visualizes the actual harvesting goal to be attained at the end of the harvesting process chain, which, in the present embodiment, is the attainable compactability—which is not specified in greater detail—of the crop material in the silo, and which is depicted symbolically as a tractor driving toward a silo. In functionality window 43 situated below it, the operating parameter "length-of-cut setting" is shown, since this operating parameter is variable and has considerable influence on the level of compactability of crop material in a silo that may be attained.

Functionality window 44 shows the operator the prognosis regarding the attainable compactability of the crop material in the silo which results from the comparison of the current length of cut and the current crop material moisture with the set criterium that is based on expert knowledge, is stored in the memory and evaluation unit, and, as the set harvesting goal, represents the maximum attainable compactability of crop material that exists based on the relationship between crop material moisture and crop material length. As an example, the prognosis is shown here as a traffic light field 47 which includes a red field 45 and a green field 46; green field 46 which is highlighted in this case informs the operator that, based on the current crop material moisture of 60% as displayed in the functionality window, and based on the length-of-cut setting of 7 mm that is displayed in the functionality window, and with consideration for the set criterium stored in the memory and evaluation unit, the prognosis indicates that it is possible to subsequently attain an adequate compaction of the crop material in the silo, thereby ensuring that, under the current conditions, the operator does not need to adjust the operating parameters, in particular he does not need to change the length of cut which is depicted in functionality window 38.

FIG. 3 shows a second embodiment of the depiction of the prognosis on screen 30 of input and display unit 23. Input and display unit 23 corresponds to input and display unit 23 shown in FIG. 2, but block 35 shown on the right-hand side in basic viewing screen 31 differs from block 35 shown in FIG. 2 in that the operator is shown the prognosis regarding the attainable actual harvesting goal in a more detailed form, and the prognosis regarding the attainable actual harvesting goal is negative. In accordance with FIG. 1, first block 33 and second block 34 shown in basic viewing screen 31 display a selection of operating parameters and crop material parameters of the harvesting machine which is engaged in a harvesting operation, it being possible for the operator to select which parameters are displayed. Functionality windows 36, 37, 38, 39, 40, 41 display, e.g. the engine speed, the crop material moisture that was sensed, the current length-of-cut setting, the number of operating hours, the engine oil temperature, and the ground speed, as numerical values with the appropriate unit. In functionality window 42, third block 35 visualizes the actual harvesting goal to be attained at the end of the harvesting process chain, which, in the present embodiment, is the compactability of the crop material in the silo, and which is depicted symbolically as a tractor is driving toward a silo.

Functionality window 43 that is situated underneath functionality window 42 shows the evaluation of the prognosis in the form of an icon, a sad face, which informs the operator that the prognosis regarding the attainable actual harvesting goal is negative. It is possible for other evaluation icons that are known per se to be used to indicate negative or positive results. In functionality window 44 situated underneath, the operator is now shown the operating parameter—the length-of-cut setting, in the current example—that should be changed in order for the prognosis regarding the actual harvesting goal to be attained at the end of the harvesting process chain to become positive. In functionality window 45, the operator is shown the operating parameter value for the length-of-cut setting as boxed number 46, i.e. the number nine in this case, which the experienced operator in particular may deliberately select without having to adjust any further operating parameters. The operator may therefore feel confident that, using this operating parameter adjustment, it is possible to attain the desired harvesting goal, which is the desired level of compaction of the crop material in a silo. In order to provide the experienced operator in particular with leeway in terms of setting an operating parameter, an upper limit and a lower limit are assigned to the threshold value which is stored in memory and evaluation unit in a recallable manner; the upper and lower threshold values are displayed to the operator in functionality window 45 as numerical values ten and seven, including the appropriate unit.

As long as the operating parameter "length of cut" is adjusted within this range, the operator knows that the quality of the attainable actual harvesting goal—which is the desired level of compaction of the crop material in a silo in this case—is still adequate. The operator is still able, for example, to select the setting value within this setting range, with which the harvesting machine may be operated in the most energy-efficient manner possible. In order to realize an automatic adjustment of the operating parameters, which is not described here in greater detail, and which would fully relieve the operator of tasks to perform, it is feasible for an appropriate signal to be sent by the memory and evaluation unit to the control device which controls the actuators of the harvesting machine that are known per se, are not described here in greater detail, and are responsible for implementing the length-of-cut setting, and, since the prognosis is negative, the control device automatically adjusts the operating parameter "length of cut" which is located within the range of the length-of-cut values displayed in functionality window 45.

It will be understood that each of the elements described above, or two or more together, may also find a useful application in other types of constructions differing from the types described above.

While the invention has been illustrated and described as embodied in An agricultural harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A forage harvester, comprising
a plurality of working units;
an input and display unit;
a memory and evaluation unit; and
a control unit for influencing adjustable parameters of said working units;
wherein said memory and evaluation unit is configured to store at least one set criteria in a recallable manner, so that based on at least one parameter selected from the group consisting of a crop material parameter, an operating parameter and both that was determined in a harvesting process, and based on the at least one said criteria, a prognosis regarding an attainability of an actual harvesting goal is formulated and taken into account in an adjustment of the operating parameter by said control unit and,
wherein said actual attainable harvesting goal to be implemented by use of said memory and evaluation unit so configured is a compactability of the crop material, which is conditioned upon a relationship between the crop material's type, the crop material's moisture content and the crop material's length.

2. A forage harvester as defined in claim 1, wherein said memory and evaluating unit is configured so that the at least one said criterium defines at least one attainable set harvesting goal which represents a relationship between the at least one operating parameter and the at least one crop material parameter.

3. A forage harvester as defined in claim 1, wherein said memory and evaluation unit is configured so that the set harvesting goal is based on expert knowledge.

4. A forage harvester as defined in claim 1, wherein said memory and evaluation unit is configured so that the set harvesting goal is stored in said memory and evaluation unit in a form of a characteristic curve.

5. A forage harvester as defined in claim 1, wherein said input and display device is configured so that the prognosis regarding the attainability of an actual harvesting goal is displayed, having been evaluated, in said input and display device.

6. A forage harvester as defined in claim 1, wherein said memory and evaluation device is configured so that at least one threshold value is stored in said memory and evaluation device, and the prognosis being negative when the threshold value is fallen below, and the prognosis being positive when the threshold value is exceeded.

7. A forage harvester as defined in claim 6, wherein said memory and evaluation device is configured so that actual value is settable in a manner selected from the group consisting of by an operator, based on expert knowledge, and both.

8. A forage harvester as defined in claim 1, wherein said memory and evaluation device is configured so that an operating parameter of a further vehicle that is involved in a harvesting process is storable in said memory and evaluation device in order to determine a threshold value, and the operating parameter is entered in a manner selected from the group consisting of entered directly by a user in said input and display unit, entered automatically in said memory and evaluation device via a transfer device, and both.

9. A forage harvester as defined in claim 8, wherein said memory and evaluation device is configured so that at least one lower limit and at least one upper limit are assigned to the at least one threshold value.

10. A forage harvester as defined in claim 1, wherein said input and display unit and said control device are configured so that if the prognosis is negative, operator parameters are displayed in said input and display unit, the adjustment of which will result in a positive evaluation, or said control device adjusts the operating parameters automatically with consideration for the prognosis or both.

11. A forage harvester as defined in claim 10, wherein said input and display unit is configured so that adjustment trends for the operating parameters are displayed in said input and display unit in addition to the operating parameters.

12. A forage harvester as defined in claim 1, wherein said input and display unit is configured so that parameters from the group consisting of the operating parameters, the crop material parameters, the prognosis and the combinations thereof are displayable above displays selected from the group consisting of the attainable actual harvesting goal, the evaluation result, and a combination thereof in a form selected from a group consisting of numbers, terms, icons, and combinations thereof in said input and display unit.

* * * * *